(12) United States Patent
Iwai et al.

(10) Patent No.: US 7,980,739 B2
(45) Date of Patent: Jul. 19, 2011

(54) IN-VEHICLE ILLUMINATING DEVICE

(75) Inventors: Shiro Iwai, Niiza (JP); Tomoki Kawamura, Niiza (JP); Hiroto Murabayashi, Niiza (JP)

(73) Assignee: Honda Access Corporation, Niiza-shi, Saitama-ken (JP)

( * ) Notice: Subject to any disclaimer, the term of this patent is extended or adjusted under 35 U.S.C. 154(b) by 178 days.

(21) Appl. No.: 12/403,004

(22) Filed: Mar. 12, 2009

(65) Prior Publication Data
US 2009/0290367 A1 Nov. 26, 2009

(30) Foreign Application Priority Data

May 23, 2008 (JP) ................................. 2008-136057

(51) Int. Cl.
*B60Q 3/04* (2006.01)

(52) U.S. Cl. ....................................... 362/489; 362/559
(58) Field of Classification Search .................. 362/559, 362/471, 479, 482, 588, 478, 487
See application file for complete search history.

(56) References Cited

U.S. PATENT DOCUMENTS

| | | | |
|---|---|---|---|
| 4,947,293 A | 8/1990 | Johnson et al. | |
| 2002/0084154 A1* | 7/2002 | Peter | 188/156 |
| 2005/0057938 A1* | 3/2005 | Mertens et al. | 362/487 |
| 2006/0221310 A1* | 10/2006 | Kim et al. | 353/99 |

FOREIGN PATENT DOCUMENTS

| | | |
|---|---|---|
| DE | 296 13 798 U1 | 12/1996 |
| EP | 0 650 011 A1 | 4/1995 |
| EP | 0 736 415 A1 | 10/1996 |
| JP | 2000-221502 A | 8/2000 |
| JP | 2000-331522 A | 11/2000 |
| JP | 2003-100134 A | 4/2003 |
| JP | 2003-297108 A | 10/2003 |
| JP | 2004-150850 A | 5/2004 |
| JP | 2005-32579 A | 2/2005 |

OTHER PUBLICATIONS

United Kingdom Search Report dated Jun. 17, 2009, issued in corresponding United Kingdom Patent Application No. GB0904446.2.
Japanese Office Action dated Apr. 12, 2010, issued in corresponding Japanese Patent Application No. 2008-136057.

* cited by examiner

*Primary Examiner* — David V Bruce
(74) *Attorney, Agent, or Firm* — Westerman, Hattori, Daniels & Adrian, LLP

(57) ABSTRACT

An in-vehicle illuminating device 1 capable of efficiently guiding luminous flux emitted from a luminous source to a light guiding body. The in-vehicle illuminating device 1 is provided with a rod-shaped light guiding body 13 which reflects, on its inner surface, light rays incident from an optical incidence plane 16 provided at an end 13a to guide the light rays to the other end longitudinally provided, a lamp 19 which emits light to a direction orthogonal to the longitudinal direction of the rod-shaped light guiding body 13 and is arranged in the vicinity of the optical incidence plane 16, and an light introducing body 20 for introducing the luminous flux emitted from the lamp 19 to the optical incidence plane 16. The light introducing body 20 allows the optical incidence plane 16 to be set within a range of the luminous flux emitted from the lamp 19.

4 Claims, 8 Drawing Sheets

| OPTICAL GUIDING BAR POSITION (BAR INSERTION AMOUNT) | LUMINANCE (IN) | RELATIVE LUMINANCE (IN) | LUMINANCE (CTR) | RELATIVE LUMINANCE (CTR) | LUMINANCE (OUT) | RELATIVE LUMINANCE (OUT) | RELATIVE EFFICIENCY | LIGHT APPEARANCE |
|---|---|---|---|---|---|---|---|---|
| EMBODIMENT 0 (STANDARD 7mm) | 10.800 cd/m² | 1.0 | 0.941 cd/m² | 1.0 | 0.471 cd/m² | 1.0 | 1.0 | |
| COMPARATIVE EXAMPLE 1 +1 mm | 7.714 cd/m² | 0.7 | 0.549 cd/m² | 0.6 | 0.314 cd/m² | 0.7 | 0.7 | |
| COMPARATIVE EXAMPLE 2 -5 mm | 3.528 cd/m² | 0.3 | 0.431 cd/m² | 0.5 | 0.274 cd/m² | 0.6 | 0.5 | |

FIG. 11

IN-VEHICLE ILLUMINATING DEVICE

BACKGROUND OF THE INVENTION

1. Field of the invention

The present invention relates to an in-vehicle illuminating device, and more particularly, to an in-vehicle illuminating device suitably used for an in-vehicle illuminating system arranged in an in-vehicle instrument panel or the like.

2. Description of the Related Art

Heretofore, there has been known, as an in-vehicle illuminating device arranged in an in-vehicle instrument panel, for example, a device comprising a rod-shaped light guiding body and a luminous source, such as an LED (Light-Emitting Diode) arranged at an end of the rod-shaped light guiding body to guide luminous flux emitted from the luminous source from the first end of the rod-shaped light guiding body to the second end thereof.

In a case where such device is designed so that the luminous source is arranged coaxially with the rod-shaped light guiding body to emit luminous flux in parallel with a longitudinal direction of the rod-shaped light guiding body, however, there has been a problem that the in-vehicle illuminating device becomes too large in size as a whole in the longitudinal direction since the luminous source must be arranged adjacent to an end face of the end of the rod-shaped light guiding body in parallel therewith.

To address this problem, Japanese unexamined patent publication No. 2000-331522, for example, proposes arranging a luminous source so as to emit light to a direction orthogonal to a longitudinal direction of the rod-shaped light guiding body. However, according to this prior art, there has also been a problem that due to the rod-shaped light guiding body being orthogonal to the luminous flux emitted from the luminous source, it is difficult to efficiently guide the luminous flux emitted from the luminous source into the light guide, thus making it impossible to obtain a bright illuminating device.

SUMMARY OF THE INVENTION

Therefore, in view of the problem described above, it is an object of the present invention to provide an in-vehicle illuminating device capable of efficiently guiding luminous flux emitted from a luminous source.

To attain the above object, the in-vehicle illuminating device according to a first aspect of the present invention includes:

one or more rod-shaped light guiding bodies each having an inner surface, a first end and a second end provided in a longitudinal direction, said rod-shaped light guiding bodies reflecting, on the inner surface, light rays incident from an optical incidence plane provided at the first end thereof to guide the reflected light rays to the second end thereof, a luminous source arranged in the vicinity of said optical incidence plane, said luminous source emitting light to a direction orthogonal to the longitudinal direction of said rod-shaped light guiding body, and an light introducing body arranged between said luminous source and said optical incidence plane to introduce luminous flux emitted from said luminous source to said optical incidence plane, wherein said optical incidence plane is set within a range of the luminous flux emitted from said luminous source.

According to a second aspect of the present invention, said rod-shaped light guiding bodies are two or more, and said light introducing body introduces luminous flux emitted from said luminous source to the optical incidence planes of said two or more rod-shaped light guiding bodies.

The in-vehicle illuminating device according to the first aspect of the present invention enables the luminous flux emitted from the luminous source to be efficiently guided into the rod-shaped light guiding body. Hence, the device can be improved in illumination efficiency.

The in-vehicle illuminating device according to the second aspect of the present invention enables the emitted luminous flux to be efficiently guided into the optical incidence plane of each rod-shaped light guiding body even if there are two or more rod-shaped light guiding bodies are provided. Hence, the device can be improved in illumination efficiency.

BRIEF DESCRIPTION OF THE DRAWINGS

These objects and other objects and advantages of the present invention will become more apparent upon reading of the following detailed description and the accompanying drawings in which:

FIG. 5 is a perspective view illustrating, in stages, assembling steps for the in-vehicle illuminating device according to the present embodiment, in which

FIG. 11 is a table illustrating a preferred embodiment and two comparative examples.

DETAILED DESCRIPTION OF THE PREFERRED EMBODIMENT

Figure 1:
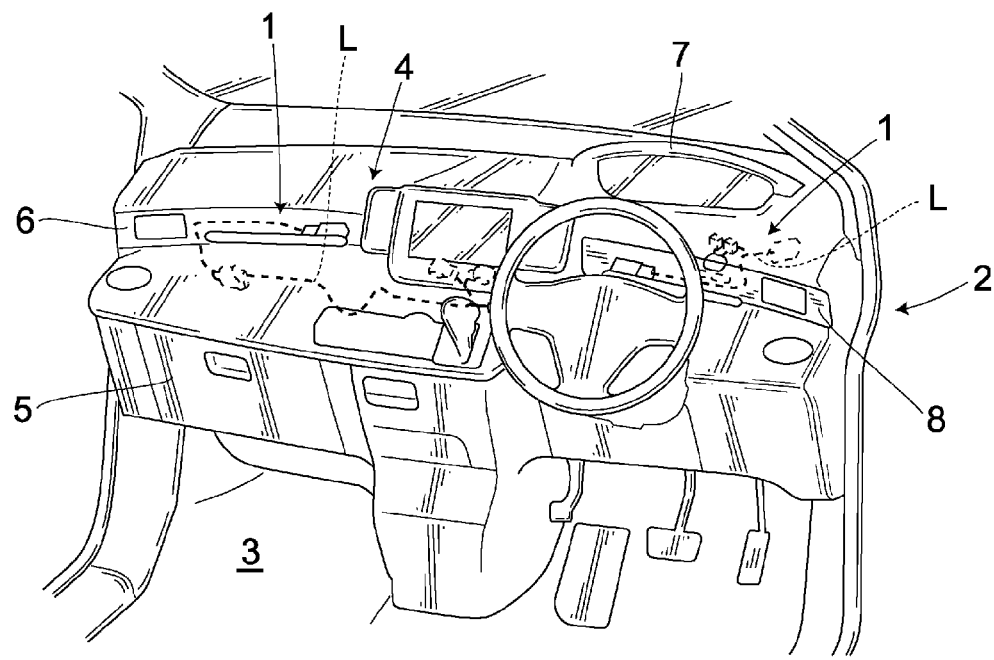
FIG. 1 is an overall perspective view illustrating an in-vehicle illuminating device in actual use according to the present embodiment.

Hereunder is a description of a preferred embodiment of the present invention with reference to the accompanying drawings. An in-vehicle illuminating device 1 shown in FIG. 1 is mounted on an instrument panel 4 arranged in a vehicle interior 3 of a vehicle 2. According to the present embodiment, the device 1 is incorporated in a left outlet panel 6 provided at a top of a glove compartment 5 and in a right outlet panel 8 provided at a bottom of a meter panel 7 and is connected electrically with an electric power supply (not shown) through a wire harness L. Thus, the in-vehicle illuminating device 1 mounted on the instrument panel 4 is configured so as to illuminate the instrument panel 4 to thereby permit illumination to be provided to the vehicle interior 3 as an indirect illumination.

Figure 2:
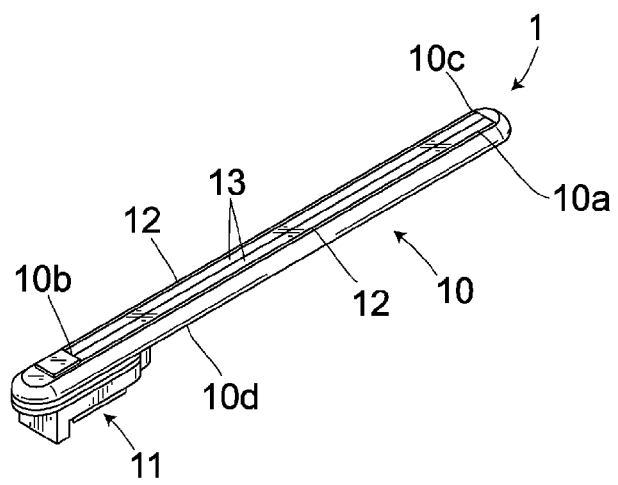
FIG. 2 is a perspective view illustrating an overall structure of the in-vehicle illuminating device according to the present embodiment.

As shown in FIG. 2, the in-vehicle illuminating device 1 is provided with an optical guiding unit 10 and a luminous source unit 11, which are integrated with each other by means of a base 12. The optical guiding unit 10 comprises a rod-shaped light guiding body 13 that is held so as to enable the body 13 to be exposed to a surface 10*a* on one side of the unit 10. The rod-shaped light guiding body 13 extends longitudinally from one end 10*b* to the second end 10*c*. The number of the optical guiding bodies provided herein is two or more, which is two in the embodiment shown in FIG. 2.

The luminous source unit 11 is arranged at one end 10*b* of the optical guiding unit 10 so that light can be supplied from the end 10*b* to the optical guiding unit 10. The luminous source unit 11 is formed on a surface 10*d* on the other side of the optical guiding unit 10 in a protuberant manner and emits luminous flux in a direction orthogonal to the longitudinal direction of the optical guiding unit 10.

According to the in-vehicle illuminating device 1 thus structured, the surface 10*d* on the other side of the optical guiding unit 10 is allowed to abut against, e.g., a surface of the left outlet panel 6 and then the luminous source unit 11 formed in a protuberant manner on the surface 10*d* is inserted into a hole (not shown) formed beforehand in the left output panel 6 to thereby be mounted thereon. According to the in-vehicle illuminating device 1, therefore, the surface 10*d* on the other side of the optical guiding unit 10 is not exposed to the surface of the instrument panel 4 and hence a potion exposed onto the surface of the instrument panel 4 can be wholly made low-profile.

Figure 3:
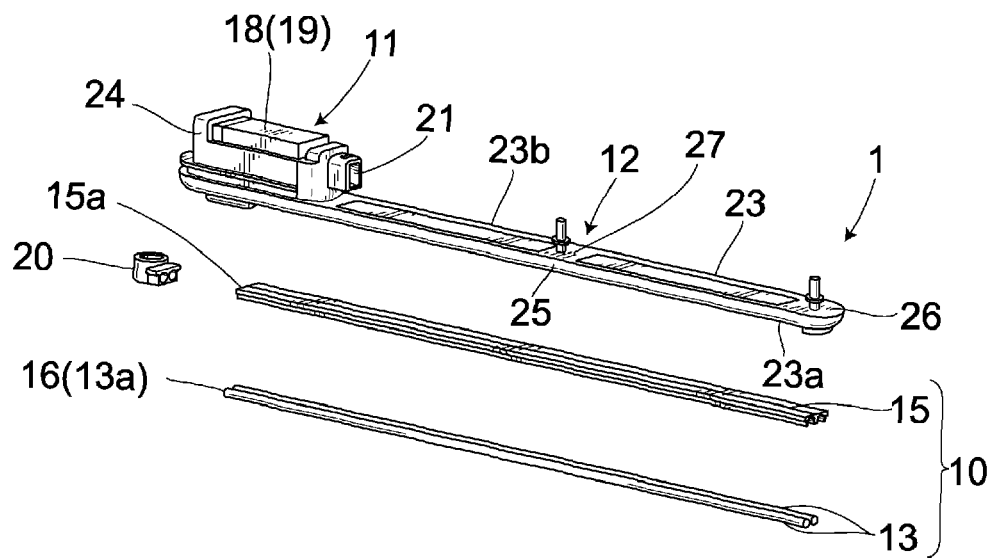
FIG. 3 is an exploded perspective view showing the in-vehicle illuminating device according to the present embodiment.

The optical guiding unit 10, as shown in FIG. 3, includes the rod-shaped light guiding body 13 and a holder 15. The rod-shaped light guiding body 13 comprises columnar linear members, for which may be preferably used optical fibers (not shown) comprising a core and a clad. An optical incidence plane 16 is formed at end 13*a* of the rod-shaped light guiding body 13. The optical incidence plane 16 is made up of a plane defined by cutting the end 13*a* of the rod-shaped light guiding body 13 perpendicularly to the longitudinal direction of the rod-shaped light guiding body 13.

The holder 15 comprises a plastic member designed so as to be capable of holding the two rod-shaped light guiding bodies 13 from the other side surface thereof. In the present embodiment, the holder 15 is slightly shorter than the rod-shaped light guiding body 13 and is formed with two grooves, approximately semicircular in cross-section, extending in parallel in the longitudinal direction on one side surface of the holder 15. Then, the holder 15 is allowed to be integrated with the rod-shaped light guiding bodies 13 by fitting the rod-shaped light guiding bodies 13 into the grooves.

The luminous source unit 11 includes a casing 18, a lamp 19 acting as a luminous source, and the light introducing body 20 and is designed so as to light the lamp 19 using an electric power supplied via the wire harness L. On a second end in the longitudinal direction of the casing 18 is provided a connector insertion hole 21 for connecting a connector (not shown) formed at the end of the wire harness L. Then, electric power fed via the connector and the wire harness L is applied to the lamp built in the casing 18. Here, an LED may be suitably employed as the lamp 19.

The base 12 comprises a rubber member, e.g., EPDM (Ethylene Propylene Diene Monomer) rubber and includes a light guide holder 23 and a luminous source holder 24. The light guide holder 23 is designed so as to be capable of detachably fixing the holder 15 integrated with the rod-shaped light guiding body 13. According to the present embodiment, the light guide holder 23 comprises a rectangular frame body composed of a linear portion 25 and an end 26 which envelops one end of the linear portion 25. A surface 23*a* on one side of the light guide holder 23 is opened, while a surface 23*b* on the other side is provided with a bottom plate 27. This light guide holder 23 allows the optical guiding unit 10 to be inserted therethrough from the surface 23*a* to fix the holder 15 so that it is integrated with the optical guiding unit 10. Further, a two-sided adhesive tape, not shown, is provided on the surface 23*b* on the other side of the light guide holder 23.

The luminous source holder 24 comprises a frame body formed, in a protruding manner, on the surface 23*b* on the other side on the end of the light guide holder 23, and is designed so as to be capable of holding the luminous source unit 11.

Figure 4:
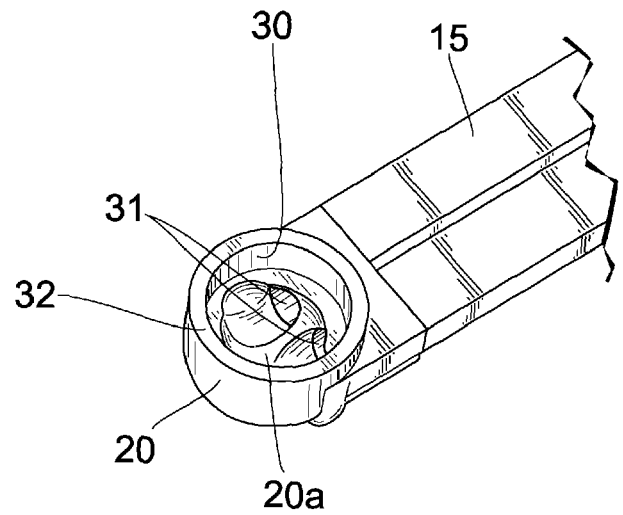
FIG. 4 is a perspective view illustrating a structure of an light introducing body of the in-vehicle illuminating device according to the present embodiment.

As shown in FIG. 4, the light introducing body 20 comprises a member having a hemispherical inner surface and includes a lamp hole 30 for inserting the lamp 19 thereinto, and light guide holes 31 for inserting the ends 13*a* of the rod-shaped light guiding bodies 13. The lamp hole 30 is opened in a direction orthogonal to the light guide hole 31. Further, an inner end of each light guide hole 31 is connected with a hemispherical inner surface 20*a*. The end 13*a* of the rod-shaped light guiding body 13 inserted thereinto abuts against the inner surface 20*a* to thereby permit the rod-shaped light guiding body 13 to be held at a given position. The light introducing body 20 thus structured forms a closed space so that light of the lamp 19 dose not leak to any outside portion other than the rod-shaped light guiding body 13. Furthermore, the inner surface 20*a* of the light introducing body 20 comprises a reflecting surface such as a mirrored surface so that the luminous flux emitted by the lamp 19 can be efficiently guided to the end 13*a* of the rod-shaped light guiding body 13.

Figure 5A:
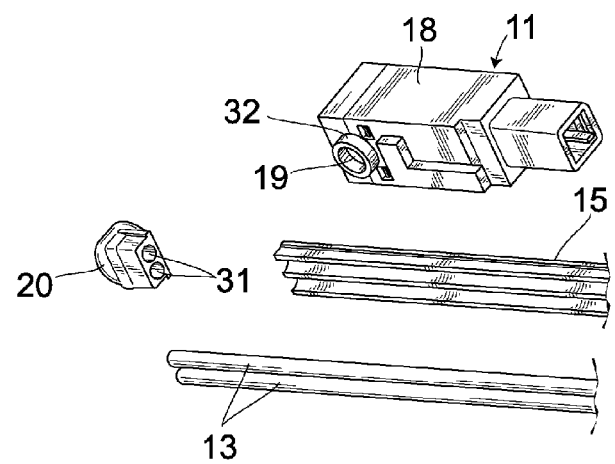
FIG. 5A is a view showing the one prior to the assembling work.

Further, as shown in FIG. 5(A), the casing 18 is provided with a light introducing body insertion section 32 for inserting the light introducing body 20 thereinto. The light introducing body insertion section 32 is opened in a direction orthogonal to the longitudinal direction of the casing 18 and is incorporated with the lamp 19.

Figure 5B:
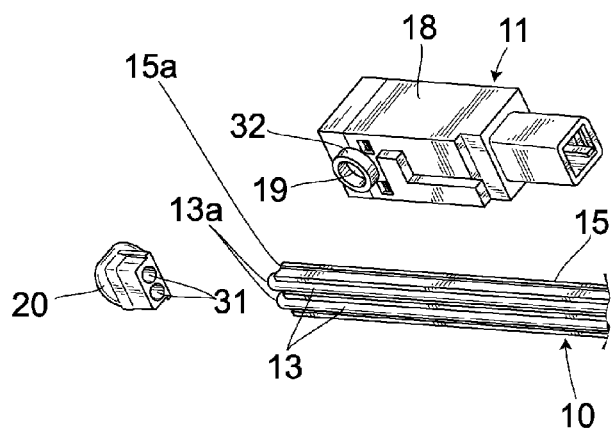
FIG. 5B is a view showing the one with an optical guiding unit assembled.
Figure 5C:
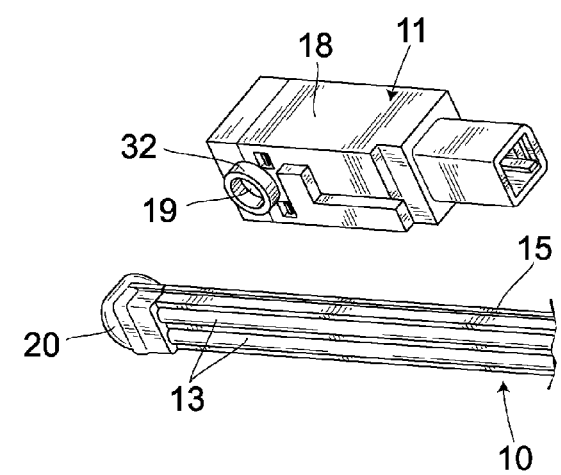
FIG. 5C is a view showing the one with the optical guiding unit being integrated with the light introducing body.

Next is a description of a method for assembling each component described above. First, the rod-shaped light guiding body 13 is fitted into the holder 15 to obtain the optical guiding unit 10 (see FIG. 5(B)). In this fitting process, the end 13*a* of the rod-shaped light guiding body 13 is allowed to protrude from the end 15*a* of the holder 15. Next, the end 13*a* of the rod-shaped light guiding body 13 which has been protruded from the end 15*a* of the holder 15 is inserted into the light guide hole 31 of the light introducing body 20 to integrate the optical guiding unit 10 and the light introducing body 20 with each other (see FIG. 5(C)).

Figure 5D:
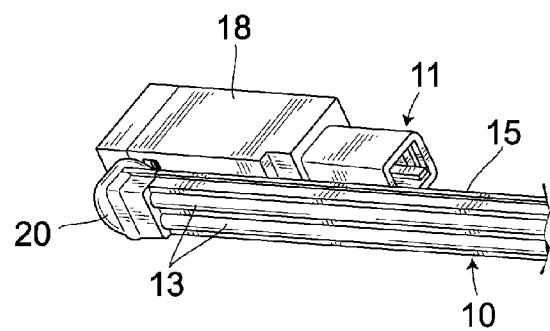
FIG. 5D is a view showing the one with the optical guiding unit being integrated with a luminous source unit.
Figure 6A:
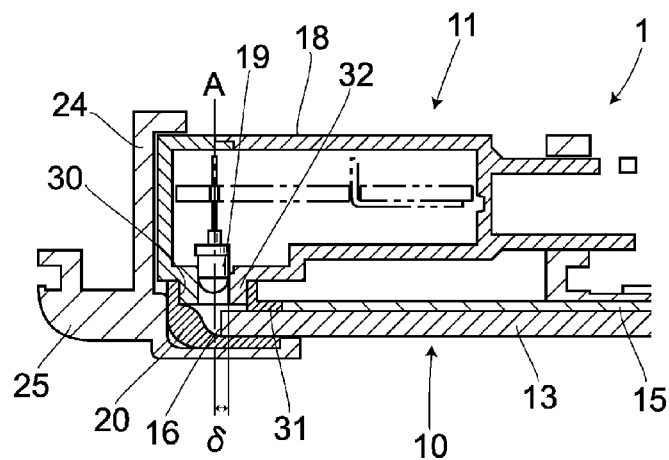
FIG. 6A is a longitudinal section of the in-vehicle illuminating device according to the present embodiment.

Then, the light introducing body insertion section 32 is inserted into the lamp hole 30 of the light introducing body 20 to integrate the optical guiding unit 10 and the luminous source unit 11 with each other (see FIG. 5(D)). Here, in order to permit the luminous flux emitted from the lamp 19 to be efficiently guided to the rod-shaped light guiding body 13, the light introducing body 20 holds the optical incidence plane 16 formed at the end 13a of the rod-shaped light guiding body 13 at a given position in relation to the lamp 19, i.e., at such a position that allows the optical incidence plane 16 to be arranged in a zone defined within a given range of the luminous flux emitted from the lamp 19. Here, the language "a zone defined within the given range of the luminous flux emitted" means the one ranging from a center of the lamp 19 to an outer edge of the lamp 19 adjacent to the light guide hole 31. According to the present embodiment, it is preferable that the light introducing body 20 holds the optical incidence plane 16, as shown in FIG. 6(A), in a zone δ between the inner surface of the light introducing body insertion section 32 adjacent to the light guide hole 31 and a central axis A, where the central axis A denotes the axis passing through the center of the lamp 19.

In this manner, the optical guiding unit 10 is integrated with the luminous source unit 11, and then, the luminous source unit 11 is inserted into the luminous source holder 24 and at the same time the holder 15 is fixed by the light guide holder 23, thereby obtaining the in-vehicle illuminating device 1 (see FIG. 2).

Next is a description of action and effect of each section in the in-vehicle illuminating device 1 thus structured. The in-vehicle illuminating device 1 according to the present embodiment is provided with the lamp 19 which emits light to the direction orthogonal to the longitudinal direction of the rod-shaped light guiding body 13. The lamp 19 is provided on the surface 10d located on the other side where the rod-shaped light guiding body 13 is not exposed. Hence, when the in-vehicle illuminating device 1 is mounted on the instrument panel 4, the thickness of the portion thereof that is exposed on the instrument panel 4 can be reduced.

Further, the light guide 20 allows the optical incidence plane 16 to be arranged in the zone defined within a range of the luminous flux emitted from the luminous source 16. Hence, the rod-shaped light guiding body 13 reflects, on its inner surface, light rays incident from the optical incidence plane 16 to guide the light rays reflected to the second end 10c of the optical guiding unit 10 provided in the longitudinal direction. Therefore, the in-vehicle illuminating device 1 can provide the light rays throughout the optical guiding unit 10 from the first end 10b to the second end 10c thereof.

Figure 7:
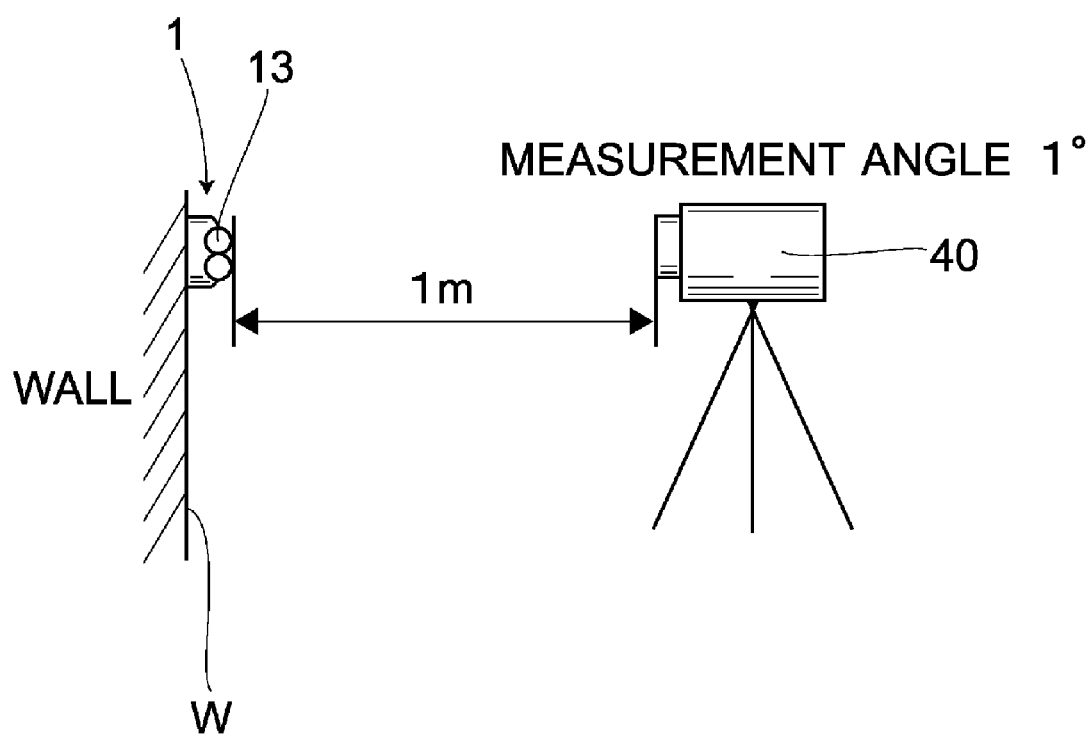
FIG. 7 is a schematic diagram showing an experimental setup for measuring luminance of the in-vehicle illuminating device according to the present embodiment.

For the in-vehicle illuminating device 1, the relation between the luminance of the rod-shaped light guiding body 13 and the relative position of the optical incidence plane 16 formed on the end 13a of the rod-shaped light guiding body 13 with respect to the lamp 19 was investigated in such a manner as shown in FIG. 7. The in-vehicle illuminating device 1 was fixed to a vertical wall W so that the longitudinal direction of the rod-shaped light guiding body 13 was aligned with the horizontal direction, and then the luminance of the rod-shaped light guiding body 13 was measured by a color luminance meter 40 (Topcon BM-5A) located one meter apart from the surface of the rod-shaped light guiding body 13.

Figure 6B:
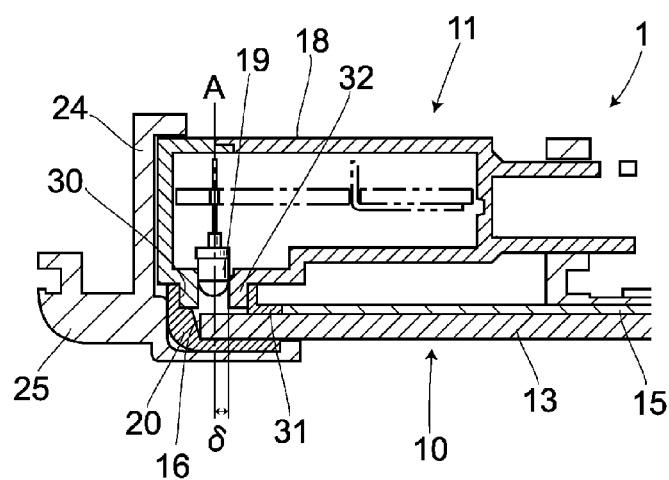
FIG. 6B is a longitudinal section of the one according to a comparative example 1.
Figure 6C:
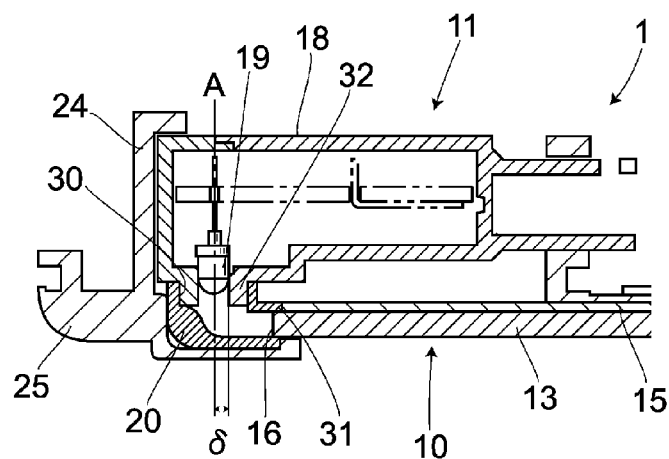
FIG. 6C is a longitudinal section of the one according to a comparative example 2.
Figure 8:
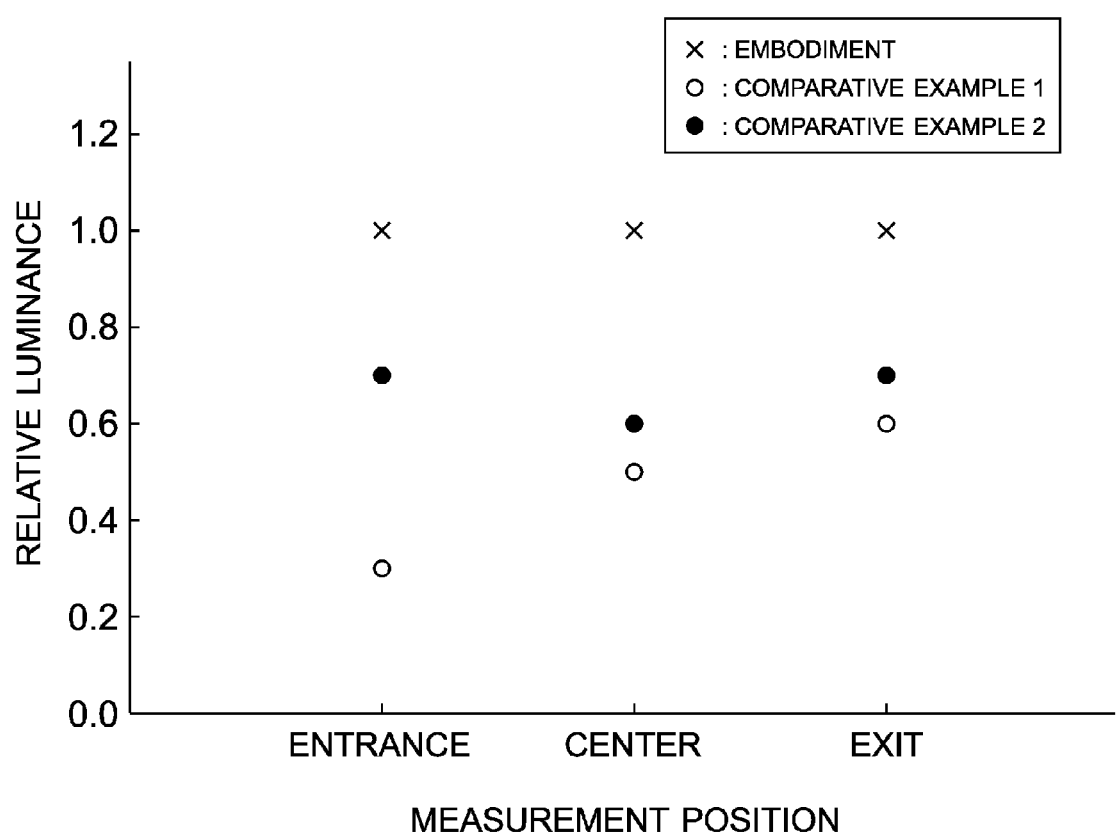
FIG. 8 is a graph showing the measurements of luminance of the in-vehicle illuminating device according to the present embodiment.

Three test pieces were prepared by changing the above-mentioned relative position (hereinafter simply represented by an insertion length). Namely, the first test piece where the optical incidence plane 16 was aligned with the central axis A with the insertion length of 0 mm, shown in FIG. 6(A), as one working example of the present embodiment where the optical incidence plane 16 was held in the zone δ defined between the inner surface of the introducing body insertion hole 32 adjacent to the light guide hole 31 and the central axis A; the second test piece with the insertion length of 1 mm as a comparative example 1, shown in FIG. 6(B) where the optical incidence plane 16 of the rod-shaped light guiding body 13 passed over the central axis A of the lamp 19 to protrude by 1 mm from the central axis A; and the third test piece with the insertion length of −5 mm as a comparative example 2, shown in FIG. 6(C) where the optical incidence plane 16 of the rod-shaped light guiding body 13 was located 5 mm short of the central axis A of the lamp 19. The luminance was measured at three positions, "entrance" in the vicinity of the optical incidence plane 16 of the rod-shaped light guiding body 13, "center" in the vicinity of the central portion of the rod-shaped light guiding body 13, and "exit" in the vicinity of the second end of the rod-shaped light guiding body 13. The results measured are shown in Table 1 and FIG. 8.

The results indicated that as compared to the test piece with the insertion length of 0 mm (the working example of the embodiment), both of the test pieces with the insertion length of 1 mm (comparative example 1) and −5 mm (comparative example 2) exhibited the reduced luminance anywhere in the rod-shaped light guiding body 13.

Consequently, according to the in-vehicle illuminating device 1 where the optical incidence plane 16 is set in the zone δ defined between the inner surface of the introducing body insertion section 32 adjacent to the light guide hole 31 and the central axis A of the lamp 19, e.g., the optical incidence plane 16 is aligned with the central axis of the lamp 19, the luminous flux emitted from the lamp 19 can be efficiently guided to the rod-shaped light guiding body 13.

Figure 9:
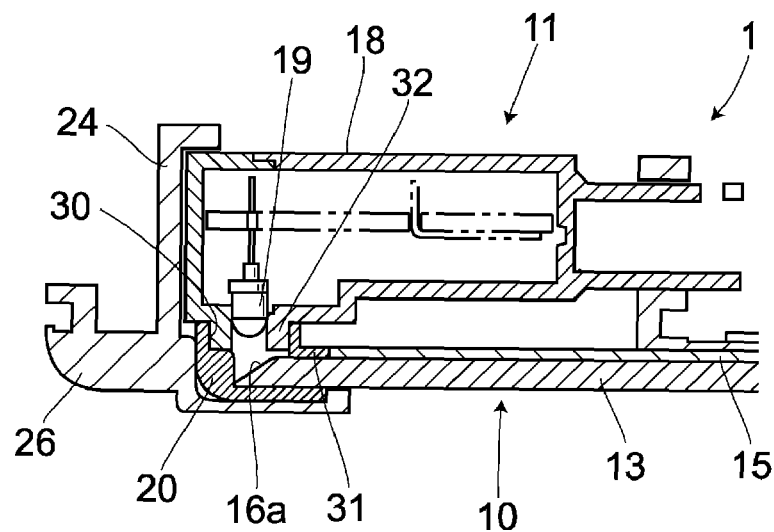
FIG. 9 is a longitudinal section of a modified example of the in-vehicle illuminating device according to the present embodiment.
Figure 10:
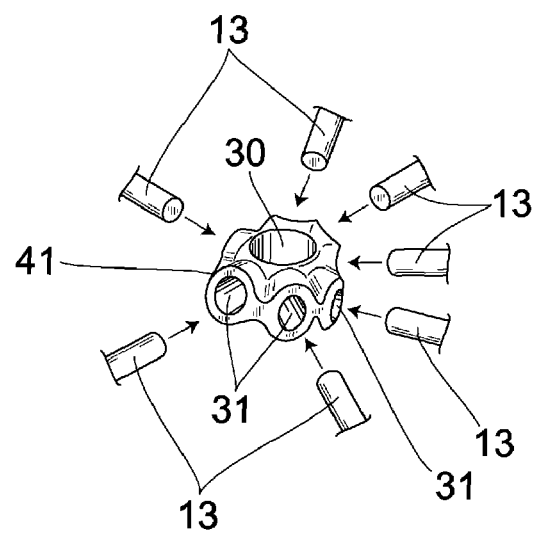
FIG. 10 is a perspective view illustrating another modified example of the in-vehicle illuminating device according to the present embodiment.

The present invention is not limited to the foregoing embodiments and various modifications are possible within the scope of the gist of the present invention. For example, although the optical incidence plane 16 formed at the end 13a of the rod-shaped light guiding body 13 is defined by the place cut vertically relative to its longitudinal direction, the present invention is not limited thereto. As shown in FIG. 9, for example, the optical incidence plane may be constituted of a plane tilting downward as it comes close to its distal end, assuming that the side having the lamp hole 30 is defined as upside. Further, whilst the two rod-shaped light guiding bodies are provided in the present embodiment, the present invention is not limited thereto. Three or more rod-shaped light guiding bodies, for example, seven rod-shaped light guiding bodies may be employed as shown in FIG. 10. In this case, a light introducing body 41 may allow the rod-shaped light guiding bodies 13 to be arranged radially around the lamp hole 30 provided in the central portion. Since such in-vehicle illuminating device 1 enables the rod-shaped light guiding bodies 13 to be arranged so as to cover a 360-degree field around the lamp 19, it may be mounted on a ceiling or the like of the vehicle interior 3 to permit light to be distributed in an extensive range.

What is claimed is:
1. An in-vehicle illuminating device, comprising:
   one or more rod-shaped light guiding bodies each having an inner surface, a first end and a second end provided in a longitudinal direction, said one or more rod-shaped light guiding bodies reflecting, on the inner surface, light rays incident on an optical incidence plane provided at the first end thereof to guide the reflected light rays to the second end thereof,
   a luminous source arranged in the vicinity of said optical incidence plane, said luminous source emitting light in a direction orthogonal to the longitudinal direction of said one or more rod-shaped light guiding bodies, and
   a light introducing body arranged between said luminous source and said optical incidence plane, said light introducing body comprising a reflecting surface on the inner surface to introduce, via said reflecting surface, luminous flux emitted from said luminous source to said optical incidence plane, wherein said light introducing body includes a lamp hole for inserting said luminous source therethrough and a light guide hole for inserting the end of said rod-shaped light guiding body therethrough, said lamp hole being opened in a direction orthogonal to said light guide hole, and wherein an inner end of said light guide hole is connected with said inner surface of said light introducing body, and the end of said rod-shaped light guiding body inserted thereinto abuts against said inner surface of said light introducing body, to thereby permit said rod-shaped light guiding body to be held at a position in which said optical incidence plane is within a range of the luminous flux emitted from said luminous source.

2. The in-vehicle illuminating device according to claim 1, wherein said rod-shaped light guiding bodies are two or more, and wherein said light introducing body introduces luminous flux emitted from said luminous source to optical incidence planes of each of said two or more rod-shaped light guiding bodies.

3. The in-vehicle illuminating device according to claim 1, wherein said light introducing body has a hemispherical inner surface.

4. The in-vehicle illuminating device according to claim 1, wherein said rod-shaped light guiding body whose end is inserted into said light guide hole allows the optical incidence plane thereof to be arranged between a central axis of said luminous source and an outer surface of said luminous source adjacent to said light guide hole.

* * * * *